United States Patent Office 3,246,999
Patented Apr. 19, 1966

3,246,999
METHOD OF PRODUCING POROUS CARBON ELEMENTS
Georges Hoynant, Lyon, France, assignor to Societe des Electrodes et Refractaires "Savoie," Paris, France, a company of France
No Drawing. Filed July 11, 1963, Ser. No. 294,224
Claims priority, application France, July 12, 1962, 903,826
4 Claims. (Cl. 106—56)

This invention relates to a method of manufacturing porous carbon elements.

The uses of carbon in the form of agglomerates as a refractory material in a neutral or reducing environment are numerous and well known. Such applications make use of the fact that this substance resists both very high temperatures and numerous chemical agents.

Porous refractory agglomerates of low density and consequently of low thermal conductivity, which combine refractory properties and low thermal conductivity in one and the same material are equally well known.

In conventional processes for producing such agglomerates, compressible or resilient materials (such as vegetable substances) are used as starting materials. Such materials are unsatisfactory for use in most present day mechanical shaping processes such as those which use extrusion presses and rams.

At the present time, in order to overcome this shaping difficulty, a pasty mixture consisting of solid, porous hydrates of carbon of vegetable origin and an aqueous suspension of hydrates of carbon capable of forming a gel is cured in a mold. The curing progresses very slowly up to a temperature of at least 500° C., until finally light, porous carbon elements having very low thermal conductivity and being workable with simple wood-cutting tools are obtained.

The main disadvantages of such current production methods are the slowness of the curing action (temperature rise of the order of 20° to 50° C. per hour) and the relatively substantial shrinkage with curing at 500° C. This shrinkage, which occurs during the higher temperature stages of the curing process, reaches such values that the volume of the cured product amounts to no more than one-half or one-third of the initial volume of the mold. This volumetric shrinkage corresponds to a linear shrinkage of 20% to 30% which represents an important cause of cracking or crazing. These methods, in any event, result in products which cannot be used without machining.

The main object of this invention is to provide a method for producing porous carbon elements in which the above-mentioned disadvantages are minimized.

According to the present invention a method of manufacturing porous carbon elements comprises mixing a crushed solid carbonaceous binder and crushed coked vegetable matter (the latter being consequently porous and largely shrink-proof), briefly heating blocks of the mixture in molds to a temperature just in excess of the binder softening point, cooling the blocks and removing them from the molds, and firing the blocks by rapidly raising the temperature to a high value and cooling the resultant porous carbon blocks. The firing process is carried out by increasing the temperature preferably at a rate in excess of 100° C. per hour.

By using a material of vegetable origin as one of the starting materials and by coking this vegetable material at a relatively high temperature, the starting material undergoes the greater part of its shrinkage before it is formed into a block. The coked material of vegetable origin is first pulverized to a powder in such a manner as to obtain grains which are light, porous and stabilized.

Preferably coke made from sawdust or crushed wood charcoal is used.

The second constituent of the mixture is a finely crushed carbonaceous binder which is solid, hard and brittle at normal temperature and has a high softening temperature. In order to prevent the segregation of the constituents, a liquid or a gel may be incorporated in the mixture.

The mixture is shaped in a mold under a mechanical pressure just adequate to insure satisfactory filling of the mold, but not great enough to set up stresses which, if released during curing, could cause cracks to occur. The mixture is brought to a temperature just in excess of the softening point of the carbonaceous binder for a short time, so that the grains of this softened binder bind the grains of coke to each other to impart the desired cohesion to the finished component. This heating operation may be performed by various means, for example by the process described in the copending U.S. patent application of Jean-Pierre Kiehl and Georges Hoynant, Serial No. 294,227, filed July 11, 1963, entitled Method for the Rapid Molding of Permeable Units, and assigned to the same assignee as the present invention, now abandoned, said process being also described in French application for Patent No. 903,671, filed July 11, 1962, the priority of which is claimed in said copending U.S. application. After cooling, a porous blank, which is rigid and suitable for handling is stripped from the mold ready for firing.

The final heat treatment or firing operation is carried out for example in a tunnel oven which is capable of a high rate of temperature rise, advantageously at a rate between 100° and 200° C. per hour.

Subsequent steps in the production including cooling and purification are carried out in a conventional manner.

A specific example of a method of producing porous carbon elements in accordance with the invention will now be described.

This method is performed utilizing, as initial materials, sawdust and a KS–125 pitch, that is a pitch having a softening point of 125° C. according to the Kramer-Sarnow method. The sawdust is calcined at 700° C. The pitch is reduced to powder. A mixture comprising 38.5% by weight of fine calcined sawdust, 38.5% by weight of crushed pitch and 23% by weight of water is mixed in the cold state, placed in a mold and then heated to 140° C. At this temperature the softened pitch binds the grains of coked sawdust to each other. The temperature is then reduced to 100° C. whereupon the pitch solidifies sufficiently so that the blank holds up under handling. After stripping from the mold, the blanks thus obtained are then fired up to a temperature of 1200° C. in a tunnel oven having a neutral or reducing atmosphere. The resultant product has the following properties:

Mean linear shrinkage during firing _____ 5.4%.
Density _____ 0.35.
Mechanical strength _____ 10 kgs./cm.$^2$.
Thermal conductivity _____ 0.3 kcal./m.$^2$/h./° C./m.

This process may be carried out at a much greater speed than previously known processes. A large number of blanks ready for handling can be stripped from the molds before the firing process, preventing the immobilization and wearing of many molds in the firing kiln. Furthermore, the blanks undergo very little shrinkage during curing. This shrinkage is lower than 7% linearly (it may drop as low as 2%) and diminishes as the coking temperature of the initial vegetable substance is increased. Finally, the units obtained are free of cracks.

The shrinkage is sufficiently constant, with an identical starting mixture, for the sizes of the components after curing to have the usual desired tolerances of ±1%. Subsequent machining may thus be normally omitted.

While the invention has been described herein in terms of an example, the invention is not restricted thereto, being susceptible of numerous variations within the scope of the appended claims.

Final products have the following mean characteristics:

Density _____ Lower than 0.5
Mechanical strength _____ 10 kg./cm.$^2$
Thermal conductivity _____ Lower than 0.5 kcal./m.$^2$/h./° C./m.

They may be used as refractory bricks with low thermal conductivity and low density, or for preparing porous electrodes. In that occurrence, the steps of the process are the same, but the raw materials will be slightly different.

It is possible to obtain elements with a higher density, either by increasing the shaping pressure, or by using constituents denser than pure calcined sawdust.

For instance, according to the same process, the use of a mixture comprising 25% by weight of calcined sawdust, 15% by weight of finely crushed coke, 40% by weight of KS–125 pitch, and 20% by weight of water, permits to obtain elements with a density of 0.62 and a mechanical strength of 54 kg./cm.$^2$.

I claim:

1. A method of producing low-density porous carbon elements comprising mixing at room temperature a crushed pitch binder which is solid, hard and brittle at room temperature with porous crushed coked vegetable matter, shaping the resulting mixture without heating into blocks in molds, heating the blocks in molds to a temperature just sufficiently above the softening point of the binder and for a time just long enough to cause particles of the binder to bind the particles of coked vegetable matter together, cooling the blocks below said softening point, stripping them from the molds, and firing the blocks to a temperature sufficient to produce low temperature porous carbon elements.

2. A method of producing low-density porous carbon elements comprising mixing at room temperature a crushed pitch binder which is solid, hard and brittle at room temperature with porous crushed coked vegetable matter, shaping the resulting mixture without heating into blocks in molds, heating the blocks in molds to a temperature just sufficiently above the softening point of the binder and for a time just long enough to cause particles of the binder to bind the particles of coked vegetable matter together, cooling the blocks below said softening point, stripping them from the molds, and firing the blocks by raising the temperature thereof at a rate between 100° and 200° C. per hour to a temperature sufficient to produce low density porous carbon elements.

3. A method of producing low-density porous carbon elements comprising mixing at room temperature a crushed pitch binder which is solid, hard and brittle at room temperature with porous crushed coked vegetable matter, shaping the resulting mixture without heating into blocks in molds, heating the blocks in molds to a temperature just sufficiently above the softening point of the binder and for a time just long enough to cause particles of the binder to bind the particles of coked vegetable matter together, cooling the blocks below said softening point, stripping them from the molds, and firing the blocks by raising the temperature thereof to at least 1200° C. at a rate between 100° and 200° C. per hour.

4. A method of producing low-density porous carbon elements comprising mixing at room temperature about 40% by weight of crushed pitch binder which is solid, hard and brittle at room temperature with about 40% by weight of porous crushed coked vegetable matter and about 20% by weight of water, shaping the resulting mixture without heating into blocks in molds, heating the blocks in molds to a temperature just sufficiently above the softening point of the binder and for a time just long enough to cause particles of the binder to bind the particles of coked vegetable matter together, cooling the blocks below said softening point, stripping them from the molds, and firing the blocks by raising the temperature thereof to at least 1200° C. at a rate between 100° and 200° C. per hour.

References Cited by the Examiner

UNITED STATES PATENTS

| | | | |
|---|---|---|---|
| 2,270,181 | 1/1942 | Cole et al. | 106—56 |
| 2,799,052 | 7/1957 | Stroup | 106—56 |

SAMUEL H. BLECH, *Primary Examiner.*

TOBIAS E. LEVOW, *Examiner.*